United States Patent [19]

Speer

[11] Patent Number: 5,674,558
[45] Date of Patent: Oct. 7, 1997

[54] WIPE-ON CLEAR PROTECTANT POLYURETHANE FINISH FOR LEATHER AND ARTIFICIAL LEATHER ARTICLES

[75] Inventor: Lawrence L. Speer, Phoenix, Ariz.

[73] Assignee: Repair-It Industries, Inc., Phoenix, Ariz.

[21] Appl. No.: 528,046

[22] Filed: Sep. 14, 1995

[51] Int. Cl.$^6$ ............................................. B32B 35/00
[52] U.S. Cl. ...................... 427/140; 427/322; 427/323; 427/389; 427/429
[58] Field of Search ........................... 427/140, 322, 427/323, 389, 429

[56] References Cited

U.S. PATENT DOCUMENTS 4,789,718  12/1988  Noll et al. .................. 528/65 X
4,948,443  8/1990   Speer ....................... 427/140 X
5,061,517  10/1991  Speer ....................... 427/389 X

*Primary Examiner*—Michael Lusignan
*Attorney, Agent, or Firm*—Cushman Darby & Cushman Intellectual Property Group of Pillsbury Madison & Sutro LLP

[57] ABSTRACT

A wipe-on clear protectant based on polyurethane is provided, which provides a finish that is durable and long lasting, is not injurious to the leather or artificial leather on which it is applied, in the instance of use on vinyl, impedes, rather than fosters, plasticizer migration, and is not slippery or tacky to the touch. In the preferred composition, polyurethane is dissolved in isopropyl alcohol, and ethylene glycol monobutyl ether is added, and the resulting liquid is wiped as a clear liquid onto the surface of the cleaned and dry leather or artificial leather produce which is to be protected. The finish dries clear, even, waterproof, smooth and without tackiness in less than thirty minutes.

1 Claim, No Drawings

WIPE-ON CLEAR PROTECTANT POLYURETHANE FINISH FOR LEATHER AND ARTIFICIAL LEATHER ARTICLES

BACKGROUND OF THE INVENTION

Today, there are many products referred to as clear protectants. They are mostly silicone bases, or are a completely silicone-resin product, that are applied to leather, vinyl and rubber. Their primary use is on automotive dashboards, car seats of vinyl and leather, vinyl automotive tops and tires. These products are continually advertised on TV nationwide. There are also other protectants on the market, all for the automotive field, some which may be acrylic based (water based acrylic with silicone or silicone-resin, with a small percentage of acrylic water-based resin in them). The overall usage and primary use for these products is in and on automobiles. No usage has been suggested for the home, such as leather furniture, vinyl furniture, golf bags, and many other items, such as leather jackets, and the like, made from leather or vinyl materials. There are many items made from leather and vinyl, but none of these protectants suggests a use on these materials. One primary reason is that all of the protectants leave a somewhat greasy or slippery feel on the leather or vinyl surface after they are used. This is primarily because of the silicone in the product. Moreover, silicone and oil-based products tend to, and do, in fact, encourage plasticizer migration. The oil or silicone oil in the product draw out or cause an affinity to take place between the oil (silicone oil) and the plasticizer in the vinyl or leather coating and, thus, draw it out, rendering the leather or vinyl harder, and more brittle. This will eventually cause the material to crack and be ruined. Many consumers, who have used these typical protectants, have experienced the slippery and other affects mentioned in this document. Moreover all of these "protectants" are milky white in nature and, while they dry to a clear finish, if applied in the direct sunlight, it is possible that they dry so quickly that the milky white appearance stays in the finish, leaving a very unsightly appearance. While these protectants are highly advertised, they do not leave any type of positive, lasting effect to the material to which they are applied and are easily removed with water and body wear. Moreover, the silicone often readily comes off on the clothing of the consumer and the protectant does not last long. In fact, this is the marketing concept of the manufacturers. Many, and continued, applications are required on the product and the result is a glossy appearance on the leather, vinyl or rubber. This treatment has to be continually applied and the results are commonly more negative than positive, concerning the affects these products have on the leather, vinyl and rubber. The wide purchasing of these products by consumers points out that there is a need for a quality product, that will brighten, clean and protect vinyl and leather materials.

The term "vinyl" as used herein, except in a chemical formula, is intended in the colloquial sense to refer to artificial, leather-substitute materials used as flexible, durable surfaces and barriers on consumer products, regardless of whether from the viewpoint of a chemist, the material has one or more univalent $C_2H_3$ substituents.

SUMMARY OF THE INVENTION

A wipe-on clear protectant based on polyurethane is provided, which provides a finish that is durable and long lasting, is not injurious to the leather or artificial leather on which it is applied, in the instance of use on vinyl, impedes, rather than fosters, plasticizer migration, and is not slippery or tacky to the touch. In the preferred composition, polyurethane is dissolved in isopropyl alcohol, and ethylene glycol monobutyl ether is added, and the resulting liquid is wiped as a clear liquid onto the surface of the cleaned and dry leather or artificial leather product which is to be protected. The finish dries clear, even, waterproof, smooth and without tackiness in less than thirty minutes.

DETAILED DESCRIPTION

The preferred use of the clear protectant of the present invention is to improve or restore appearance or forestall wear on the surface of a consumer product made of leather or artificial leather, such as upholstery of seating furniture and automobiles, golf bags, jackets and other wearing apparel.

The fundamental ingredient of the wipe-on composition is polyurethane.

The preferred source material of the polyurethane used in the wipe-on composition is Spenlite® L90-20A polyurethane lacquer, obtained from Reichold Chemicals, Coating Polishers and Resins Division, of Research Triangle Park, N.C. 27709. The source material is said by its manufacturer to have the following composition:

| Constituent | Percent by Weight |
| --- | --- |
| Urethane polymer | 20.0 |
| Isopropyl alcohol | 78.0 |
| Toluene | 2.0 |

Broadly, the wipe-on composition product is formulated by cutting the L90 product with a blend of isopropyl alcohol and Butylcellosolve (ethylene glycol monobutyl ether from Union Carbide) optionally adding an ultraviolet inhibitor, a plasticizer, an adhesion-improving agent and/or a flatting agent.

In place of some of the preferred urethane polymer, there may be used polyester or polyether resin.

The effects of adding additional solvent to the polyurethane lacquer are to thin the composition and slow its drying time, thus making it more suitable for use as a wipe-on coating that is easy for a consumer to apply.

In place of some of the preferred isopropyl alcohol and toluene, other useful solvents are methyl isobutyl ketone, diisobutyl ketone, methoxypropylacetate and methyl ethyl ketone.

By preference, the solvents to be used, apart from those already contained in the polyurethane lacquer, are first mixed together with one another, with agitation, and the polyurethane lacquer is slowly added to the mixture of solvents, with continuing agitation preferably at 1000 RPM, in order to avoid congealing of the mixture, until a homogenous blend is achieved.

The resin can range from 1 to 75 percent by volume in the wipe-on composition, and solvents from 90 to 5 percent by volume.

Another typical formulation for the wipe-on composition is:

| Ingredient | Percent by Volume |
| --- | --- |
| Urethane | 8.0 |
| Isopropyl alcohol | 17.5 |

-continued

| Ingredient | Percent by Volume |
| --- | --- |
| Toluene | 17.5 |
| Ethylene glycol monobutyl ether | 20.0 |
| PM acetate | 35.0 |
| TinUVin UV inhibitor | 2.0 |

The preferred ultraviolet inhibitor is TinUVin available from Ciba-Geigy. Alternatively useful is Daro Care, both of these being brand names for commercially available ingredients for preventing yellowing of the resin.

The preferred plasticizer is Monsanto Chemical #711. Alternatively useful is D.O.P. a Union Carbide product.

The preferred adhesion-improving agent is N-methyl pyrrolidone. Alternatively useful is methyl ethyl ketone.

Therefore, the preferred composition of the wipe-on composition, including the ingredients which are added as a result of using the L90 starting material is

| Constituent | Percent by Volume |
| --- | --- |
| Urethane polymer | 6 |
| Isopropyl alcohol | 70 |
| Toluene | — |
| Ethylene glycol monobutyl ether | 20 |
| Ultra violet inhibitor | 0.5–2.0 |
| Flatting agent | — |

Optional ingredients include a flatting agent to reduce gloss, preferably Syloid (up to 4 parts by volume).

The consumer wishing to protect the surface of a leather or artificial leather product, first thoroughly cleans the surface, preferably using a non-soapy cleaner, and lets it dry. If a soapy cleaner is used, the soap film must be removed before the wipe-on composition is applied. After the surface is dry, the consumer applies the wipe-on composition, simply by wiping it on using a sponge, non-linty cloth or similar applicator, and allows the composition to dry (which takes less than 30 minutes) to a clear, smooth, even film. For best results, the product should not be applied in exceptionally humid conditions, or when the ambient temperature is below freezing or above 100° F.

The product can be applied with a clean, smooth rag, a foam rubber brush, conventional paint brush or ordinary spray equipment. The product should not be allowed to drip or run on the surface to which it is applied. If a drip or run occurs, one should immediately spread the excess product evenly with the applicator. The product is not a polish, but an easy wipe-on coating. One can protect any area of the surface which is not to be coated, with masking tape, or another covering. If the consumer wishes to have a glossier, less satiny finish, a second layer of film can be applied on the first after the first layer has dried, by wiping on a second coating, using the same composition and permitting it to dry.

The polyurethane finish will protect the leather and vinyl to a far greater extent than typical silicone protects. In fact, there is absolutely no comparison to imparting a polyurethane finish to the vinyl or leather, compared to applying the prior art protectants, which are so common on the market today. The polyurethane clear finish provides a permanent, true protection for the leather and vinyl material and eliminates the tacky, slippery feel on the material, impedes plasticizer migration, protects against common dirt and grime. Other silicone protectants do not protect against dirt and grime.

While polyurethanes are used by manufacturers of leather and vinyl as a topcoat during the manufacturing process, no one has previously come up with the concept of formulating the resin to be used by the consumer as a protectant after the leather or vinyl is used and worn. The advantages of the polyurethane over the silicone are substantial. No one has previously formulated the polyurethane resin so that it could be wiped, brushed applied with a rag or sponge.

I claim:

1. A method useful by a consumer for providing a surface of a used or worn flexible consumer product made of leather or artificial leather, such as upholstery, bags and wearing apparel, with a clear, even, waterproof, smooth and nontacky polyurethane finish, comprising:

(a) preparing a clear finishing composition by dissolving polyurethane in a solvent comprising at least one of isopropyl alcohol, ethylene glycol monobutyl ether, toluene, methyl isobutyl ketone, diisobutyl ketone, methoxypropylacetate and methyl ethyl ketone, while agitating the solvent, until a homogeneous blend is achieved and providing the finishing composition to a consumer, who thereafter performs the steps of:

(b) selecting a flexible consumer product having a used or worn surface;

(c) wet-cleaning the surface and permitting the surface to dry;

(d) wiping the finishing composition onto the surface, as a clear liquid, using an implement selected from the group consisting of a cloth, a sponge and a brush, and permitting the finishing composition to dry to nontackiness.

* * * * *